No. 32,138.  
PATENTED APR. 23, 1861.  
H. B. MASSER.  
ICE CREAM FREEZER.
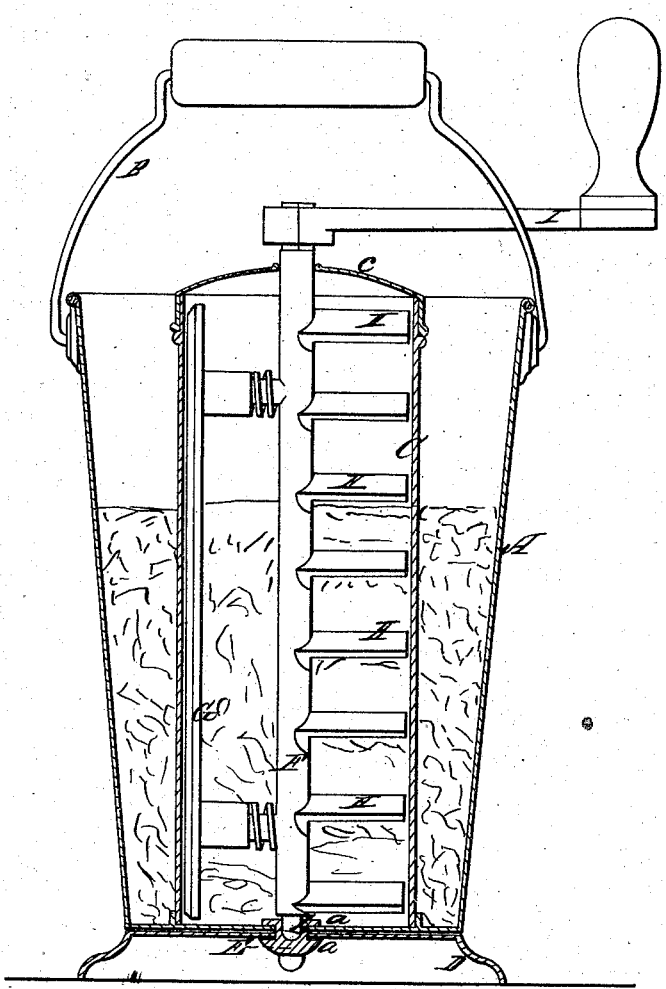
Witnesses:  
James Laird  
M. W. Livingston
Inventor:  
H. B. Masser

UNITED STATES PATENT OFFICE.

H. B. MASSER, OF SUNBURY, PENNSYLVANIA.

ICE-CREAM FREEZER.

Specification of Letters Patent No. 32,138, dated April 23, 1861.

*To all whom it may concern:*

Be it known that I, H. B. MASSER, of Sunbury, in the county of Northumberland and State of Pennsylvania, have invented a new and Improved Ice-Cream Freezer; and I do hereby declare that the following is a full, clear, and exact description of the same, reference being had to the annexed drawing, making a part of this specification, said drawing being a vertical central section of my invention.

This invention relates to a modification of an ice cream freezer for which Letters Patent were originally granted to me bearing date December 12th, 1848, additional improvements being subsequently made.

The object of the within described invention is to obtain a freezer that may be made on a small scale and at a proportionate reduced price and still retain the characteristics and advantages of the patented freezer. This result can not be obtained by merely reducing the size of the patented freezers and carrying out all the details of construction, the smaller freezers being much more expensive to construct in proportion to their size than the larger ones.

The within described invention consists in having the cream receptacle or chamber secured permanently within the ice-vessel and having the latter secured by a pivot to a proper base so as to form a swivel connection; the cream chamber being provided with the same scraper and beaters as used in my former invention.

The invention also consists in constructing the pivot in a novel way so that the same may serve as a pivot and also as a step for the scraper and beater shaft.
To enable those skilled in the art to fully understand and construct my invention I will proceed to describe it.

A. represents the ice-vessel of the freezer. This vessel may be of conical form and constructed of sheet-metal, tinned or galvanized iron would probably be the most preferable material. This ice-vessel is provided with a handle B. and within said vessel the cream receptacle C. is placed and secured concentrically and permanently in any proper way. The cream vessel or receptacle C. may be of cylindrical form and sufficiently less in diameter than the vessel A. to admit of a space of requisite capacity to contain a necessary amount of ice. The ice-vessel A. is attached to a base D. by means of a pivot E. This pivot passes centrally through the top of the base D. and the bottom of the cream receptacle or chamber C. and said pivot is provided with a head or flange $a$, at each end. The pivot is stationary being secured to the bottom of the cream receptacle or chamber and the base D. is allowed to turn freely on the pivot. The upper end of the pivot E. is recessed to form a step $b$, to receive the lower end of a vertical shaft F. which has the scraper G. and beaters H. attached or connected to it as usual and the upper end of shaft F. has a crank I. attached to it.

The cream receptacle may be constructed of the same material as the ice-vessel, the former being provided with a cover or lid $c$. The ice vessel may be open at the top.

The operation is as follows. The vessel A. is provided with a requisite quantity of ice and salt and the cream to be frozen is placed within the vessel C., the vessel A. is then rotated about half way round, first in one direction and then in the other, on its base D. by the operator grasping the handle B., and the ice in the vessel A. is by this movement made to move around the cream receptacle C. the operation being precisely the reverse of that of my patented freezer previously referred to, the cream receptacle of which, rotates within the ice vessel, the effect being the same, the ice revolving round the cream receptacle, instead of the cream chamber rotating within the ice and salt. The shaft F. is rotated from time to time as the cream freezes at the sides of the receptacle C. and at the proper time or when the cream is sufficiently frozen, the shaft F. is rotated continuously to beat the frozen cream. Any suitable beating and scraper arrangement may be used in the cream receptacle C. but that described will probably be equal to any that may be used.

By this arrangement the same effect is obtained as by the larger patented freezer, while the cost of construction is materially reduced, and quite small freezers may be constructed at a cost proportionate to their size.

Having thus described my invention what I claim as new and desire to secure by Letters Patent, is,

1. Securing the cream receptacle C. within the ice-vessel A. and attaching the latter by a swivel connection or pivot E. to the base D. to admit of the turning of the ice-vessel and cream receptacle on the base substantially as and for the purpose set forth.

2. Constructing the pivot E. with a recess $b$, in its upper end to serve as a step for the shaft F. when said pivot thus arranged is applied and used for the purpose specified.

H. B. MASSER.

Witnesses:
 JAMES LAIRD,
 M. M. LIVINGSTON.